(12) United States Patent
Issler

(10) Patent No.: US 9,784,210 B2
(45) Date of Patent: Oct. 10, 2017

(54) PISTON FOR AN INTERNAL COMBUSTION ENGINE

(71) Applicant: MAHLE International GmbH, Stuttgart (DE)

(72) Inventor: Wolfgang Issler, Schwaikheim (DE)

(73) Assignee: MAHLE International GmbH, Stuttgart (DE)

( * ) Notice: Subject to any disclaimer, the term of this patent is extended or adjusted under 35 U.S.C. 154(b) by 90 days.

(21) Appl. No.: 14/646,800

(22) PCT Filed: Nov. 22, 2013

(86) PCT No.: PCT/DE2013/000688
§ 371 (c)(1),
(2) Date: May 22, 2015

(87) PCT Pub. No.: WO2014/079406
PCT Pub. Date: May 30, 2014

(65) Prior Publication Data
US 2015/0308370 A1    Oct. 29, 2015

(30) Foreign Application Priority Data

Nov. 23, 2012  (DE) .................. 10 2012 022 913

(51) Int. Cl.
*F02F 3/00* (2006.01)
*F16J 1/16* (2006.01)
(52) U.S. Cl.
CPC .............. *F02F 3/0015* (2013.01); *F16J 1/16* (2013.01); *F02F 3/00* (2013.01)

(58) Field of Classification Search
CPC .............. F02F 3/0015; F02F 3/00; F16J 1/16
See application file for complete search history.

(56) References Cited

U.S. PATENT DOCUMENTS

| | | | |
|---|---|---|---|
| 4,291,614 A | | 9/1981 | Moelle et al. |
| 4,359,973 A | * | 11/1982 | Shimada .................. F02F 3/22 123/193.6 |
| 5,112,145 A | * | 5/1992 | MacGregor ........... F02F 3/0069 384/255 |
| 5,653,156 A | * | 8/1997 | Issler .................. F02B 23/0672 92/187 |
| 5,746,169 A | | 5/1998 | Issler et al. |

(Continued)

FOREIGN PATENT DOCUMENTS

| | | |
|---|---|---|
| DE | 28 28 402 A1 | 2/1980 |
| DE | 36 09 019 C1 | 9/1987 |

(Continued)

OTHER PUBLICATIONS

International Search Report of PCT/DE2013/000688, dated Apr. 4, 2014.

*Primary Examiner* — Joseph Dallo
*Assistant Examiner* — Kurt Liethen
(74) *Attorney, Agent, or Firm* — Collard & Roe, P.C.

(57) ABSTRACT

A piston for an internal combustion engine is proposed with a piston head and with two pin bosses which lie opposite one another, are molded integrally onto the piston head in the direction which faces away from the piston head, and have in each case one pin bore. In each case one turned groove is formed into the radially inner regions of the lower halves of the pin bores, which halves face away from the piston head.

2 Claims, 1 Drawing Sheet

(56) References Cited

U.S. PATENT DOCUMENTS

Figure 1:
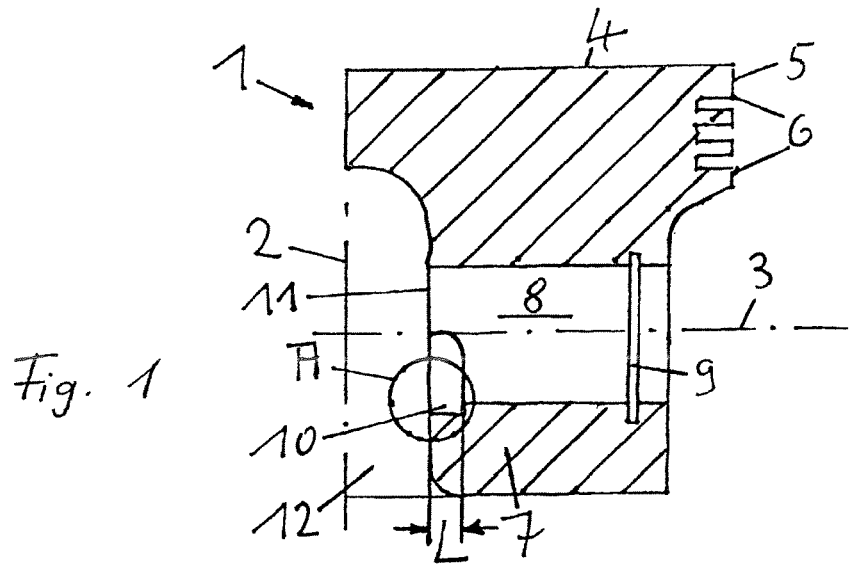

| | | | | |
|---|---|---|---|---|
| 8,011,287 B2* | 9/2011 | Fezer | ........................ | F16C 5/00 92/187 |
| 2007/0204746 A1* | 9/2007 | Issler | ........................ | F16J 1/16 92/187 |
| 2014/0150747 A1 | 6/2014 | Lochmann | | |

FOREIGN PATENT DOCUMENTS

| | | |
|---|---|---|
| DE | 43 27 772 A1 | 2/1995 |
| DE | 44 31 990 A1 | 3/1996 |
| DE | 10 2011 103 105 A1 | 11/2012 |
| JP | 59-097362 A | 6/1984 |
| JP | S62-184274 A | 8/1987 |
| JP | H09-229192 A | 9/1997 |
| JP | H11-303993 A | 11/1999 |

* cited by examiner

PISTON FOR AN INTERNAL COMBUSTION ENGINE

CROSS REFERENCE TO RELATED APPLICATIONS

This application is the National Stage of PCT/DE2013/000688 filed on Nov. 22, 2013, which claims priority under 35 U.S.C. §119 of German Application No. 10 2012 022 913.5 filed on Nov. 23, 2012, the disclosures of which are incorporated by reference. The international application under PCT article 21(2) was not published in English.

The invention relates to a piston for an internal combustion engine, having a piston crown, followed radially on the outside, in the direction facing away from the piston crown, by a ring belt, having two pin bosses formed onto the piston crown in the direction facing away from the piston crown, which lie opposite one another and each have a pin bore, and having a piston skirt that connects the pin bosses with one another.

A piston of the type stated initially is known from the Japanese application JP 62184274 A. The known piston has pin bores in which turned grooves are formed, which run radially on the inside over the entire circumference of the inside surface of the pin bores. The result achieved in this way is that in the case of deformation of the piston pin under a load, the contact region between the piston pin and the radially inner edges of the pin bores is increased in size, so that as a result, the risk that the piston pin and the piston are damaged in the region of the radially inner edges of the pin bores is reduced.

It is disadvantageous, in this connection, that as a result, the contact surface between the pin bore and the piston pin situated in it, which surface lies in the zenith region of the pin bore, is reduced, so that the pressure per contact surface exerted by the zenith of the pin bore on the piston pin becomes very great, particularly during the compression and working cycle of the engine in which the piston is installed, leading to increased wear of both the pin bore and of the piston pin here.

It is the task of the invention to avoid this disadvantage of the state of the art.

This task is accomplished in that a turned groove is formed in each of the radially inner regions of the lower halves of the pin bores, facing away from the piston crown. As a result, the zenith of the pin bore remains free of a turned groove, so that the entire zenith of the pin bore stands in contact with the piston pin, so that as a result, the pressure per contact surface is also reduced during the compression and working cycle, leading to a reduction in wear of both the piston pin and of the pin bore.

Advantageous further developments of the invention are the object of the dependent claims.

Figure 2:
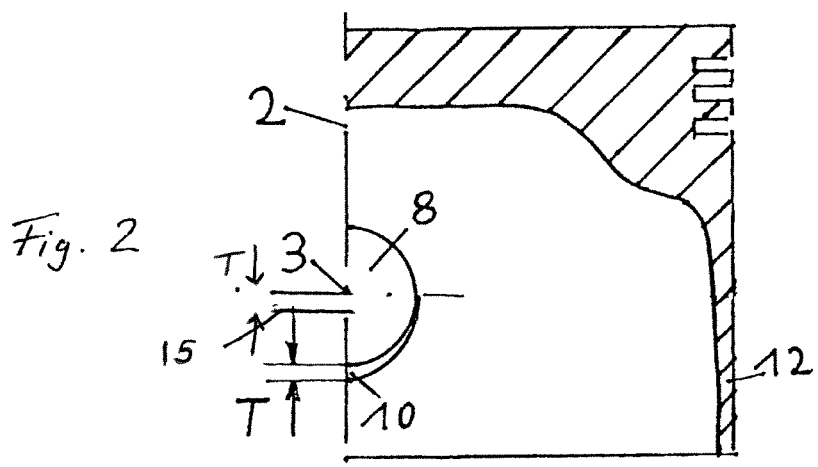
Figure 3:
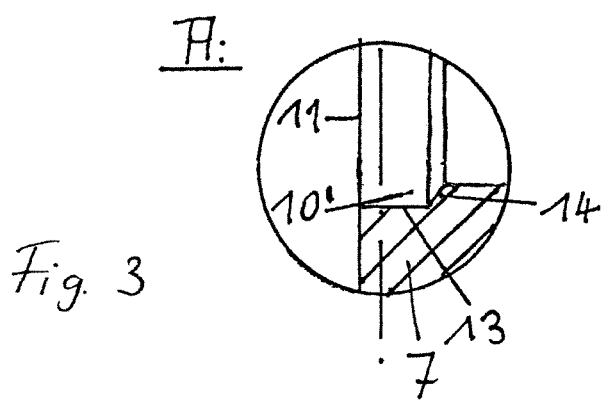

An exemplary embodiment of the invention will be described below, using the drawings. These show:

FIG. 1 one half of a piston, in section along the piston axis and along the pin bore axis, with a first embodiment of a turned groove;

FIG. 2 one half of the piston in section along a plane that lies on the piston axis and stands perpendicular to the pin bore axis, and FIG. 3 an enlargement of the detail "A" from FIG. 1, with a second embodiment of the turned groove.

FIG. 1 shows one half of a piston 1 for an internal combustion engine, in section along a plane that is spanned by the piston axis 2 and the pin bore axis 3. The piston 1 has a piston crown 4, a top land 5 that follows it radially on the outside, and a ring belt 6 that follows the top land 5 in the direction facing away from the piston crown.

Furthermore, the piston 1 has pin bosses 7 that follow the ring belt 6 in the direction facing away from the piston crown, each having a pin bore 8. The pin securing groove 9 that is disposed in the radially outer region of the pin bore 8 can also be seen. With the position of the section plane according to FIG. 1, the piston skirt 12, which connects the two pin bosses 7 with one another, can only be seen in a top view.

Radially on the inside, in the region of the equator and of the nadir of the wall of the pin bore 8, a turned groove 10 is formed, which reaches radially on the inside all the way to the face side 11 of the pin boss 7, and which is disposed in the lower half of the pin bore 8. In a first embodiment according to FIG. 1, the turned grooves 10 are configured in circular-cylindrical manner, with a cylinder axis 15 that lies parallel to the pin bore axis 3, and have the shape of a stair step in section.

FIG. 2 shows one half of the piston in section along a plane that lies on the piston axis 2 and stands perpendicular to the pin bore axis 3. The piston skirt 12, the pin bore 8, and the turned groove 10 disposed in the lower region of the pin bore 8 can be seen. In this connection, the turned groove 10 can have a length "L" between 0.5 mm and 3 mm and a depth "T" between 0.05 mm and 0.3 mm.

FIG. 3 shows an enlarged detail "A" from FIG. 1, which shows a second embodiment of the turned groove 10'. This groove has a radially inner region 13 that reaches all the way to the radially inner face side 11 of the pin boss 7, is circular-cylindrical, and lies parallel to the pin bore axis 3 with its cylinder axis, and a radially outer region 14 configured conically, the conicity of which opens up radially inward.

The piston 1 can consist of aluminum, cast iron or steel, and can be produced by means of casting or forging. The turned groove 10, 10' is produced by means of a lathe, in which the axis of the lathe tool is displaceable. In the production of the turned groove 10, 10', the axis of the lathe tool is at first identical with the pin bore axis 3, and is then moved downward by the distance "T" over the course of forming of the turned groove 10, 10', in the direction facing away from the piston crown.

Alternatively to this, the turned groove 10, 10' can be introduced using a second lathe tool, before and after machining of the pin bore 8 using a first lathe tool; this second tool is rotated about an axis that lies parallel to the pin bore axis 3 and has the distance "T" from the pin bore axis 3.

During engine operation, at the beginning of the intake cycle, the piston 1 is pulled downward by the connecting rod, by way of the piston pin, wherein such a force is exerted by the connection rod, on the piston pin, at higher speeds of rotation, that the piston pin bends downward. In this connection, the piston pin comes into contact with the inner, lower edge of the pin bore 8, leading to damage of the piston pin and to cracks in the piston material close to the inner, lower edge of the pin bore 8.

If the pin bore 8 has a turned groove 10, 10' in its inner, lower region, according to the present invention, the inner part of the bending piston pin lies on two edges at the beginning of the intake cycle, on which edges the pressure stress exerted by the piston pin on the inner, lower region of the pin bore 8 is distributed, so that as a result, the risk that the piston pin and the piston will be damaged in the region of the inner, lower edge of the pin bore is greatly reduced.

Furthermore, the turned groove 10, 10' offers the advantage that access of the oil to the pin bore 8 is facilitated by way of the turned groove, so that as a result, lubrication of the piston pin is improved.

A further advantage of the invention results from the fact that great pressure is exerted on the upper part of the piston pin during the compression and working cycle, by way of the zenith of the pin bore. In order to reduce this pressure per surface area as much as possible and to thereby reduce the wear of the piston pin and of the pin bore in the zenith region as much as possible, the contact surface between the zenith of the pin bore and the upper part of the piston pin should be as great as possible.

For this reason, the turned groove 10, 10' is situated in the lower half of the pin bore 8, so that the entire zenith surface of the in bore can enter into contact with the piston pin, and thereby minimal wear of the zenith of the pin bore 8 and of the upper part of the piston pin occurs.

REFERENCE SYMBOL LIST

L length of the turned groove 10, 10'
T depth of the turned groove 10, 10'
A figure detail
1 piston
2 piston axis
3 pin bore axis
4 piston crown
5 top land
6 ring belt
7 pin boss
8 pin bore
9 pin securing groove
10, 10' turned groove
11 face side
12 piston skirt
13 front region of the turned groove 10'
14 rear region of the turned groove 10'

The invention claimed is:

1. A piston for an internal combustion engine, comprising:
   a piston crown having a ring belt disposed radially on an outside,
   two pin bosses formed onto the piston crown in a direction facing away from the piston crown, said pin bosses lying opposite one another and each pin boss having a pin bore, and
   a piston skirt that connects the pin bosses with one another,
   wherein a turned groove is formed in each of radially inner regions of lower halves of the pin bores, facing away from the piston crown, said grooves extending only through said lower halves of the pin bores,
   wherein a portion of the pin boss is under each of the turned grooves on the side opposite the piston crown, and
   wherein the turned grooves are configured in a circular-cylindrical manner, with a cylinder axis that lies parallel to and offset from a pin bore axis, and having the shape of a stair step in section.

2. The piston according to claim 1, wherein a length "L" of the turned groove, measured in a direction of the pin bore axis, amounts to between 0.5 mm and 3 mm, and wherein a depth "T" of the turned groove, measured perpendicular to a pin bore axis, amounts to between 0.05 mm and 0.3 mm.

\* \* \* \* \*